United States Patent
Kim et al.

(10) Patent No.: US 7,920,657 B2
(45) Date of Patent: Apr. 5, 2011

(54) APPARATUS AND METHOD FOR DECODING SPACE-TIME BLOCK CODED (STBC) SIGNAL

(75) Inventors: Jae-hyon Kim, Suwon-si (KR); Young-hwan Kim, Hwaseong-si (KR); Hyuncheol Park, Yongin-si (KR); Hyunkuk Kim, Daejeon (KR); Wonjae Shin, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 11/863,335

(22) Filed: Sep. 28, 2007

(65) Prior Publication Data

US 2008/0292030 A1 Nov. 27, 2008

(30) Foreign Application Priority Data

May 25, 2007 (KR) ............... 10-2007-0050856

(51) Int. Cl.
*H04L 27/06* (2006.01)
(52) U.S. Cl. ........ 375/341; 375/260; 375/262; 375/267; 375/340; 714/794

(58) Field of Classification Search .......... 375/340–341, 375/260, 262, 267, 347; 714/794
See application file for complete search history.

(56) References Cited

U.S. PATENT DOCUMENTS

| 2006/0013329 A1* | 1/2006 | Han et al. ................. 375/267 |
| 2006/0039497 A1* | 2/2006 | Vu et al. .................. 375/267 |
| 2006/0268963 A1* | 11/2006 | Yoshida ................... 375/148 |

* cited by examiner

*Primary Examiner* — Curtis B Odom
(74) *Attorney, Agent, or Firm* — Sughrue Mion, PLLC

(57) ABSTRACT

Apparatus and method for decoding a Space-Time Block Coded (STBC) signal. The decoding apparatus includes a channel estimator for estimating a real equivalent channel based on a coded signal; a channel converter for decomposing the real equivalent channel to a unit matrix and a subchannel; a receive signal converter for converting the coded signal to a real equivalent receive signal and converting the real equivalent receive signal to a converted receive signal based on the unit matrix; and a detector for detecting an estimate of a transmit signal by performing a maximum likelihood decoding using the converted receive signal and the subchannel. Since the transmit signal candidates are independent of each other, the complexity of the maximum likelihood decoding can be decreased. With the lowered complexity of the receiver, the power consumption for the decoding can be reduced and the high-speed data can be transmitted more easily in the actual mobile communication environment.

16 Claims, 6 Drawing Sheets

| RECEIVER | COMPLEXITY |
|---|---|
| CONVENTIONAL | $32|\Omega|^2 C_M + 48|\Omega|^2 C_A$ |
| ONE EMBODIMENT | $(20|\Omega|+64)C_M + (16|\Omega|+56)C_A$ |
| ANOTHER EMBODIMENT | $(24\sqrt{|\Omega|}+64)C_M + (16\sqrt{|\Omega|}+56)C_A$ |

APPARATUS AND METHOD FOR DECODING SPACE-TIME BLOCK CODED (STBC) SIGNAL

CROSS-REFERENCE TO RELATED APPLICATIONS

This application claims priority under 35 U.S.C. §119 from Korean Patent Application No. 10-2007-0050856, filed on May 25, 2007, in the Korean Intellectual Property Office, the disclosure of which is incorporated herein by reference in its entirety.

BACKGROUND OF THE INVENTION

1. Field of the Invention

The present invention relates generally to a communication apparatus and a control method thereof. More particularly, the present invention relates to an apparatus for decoding a space-time block coded (STBC) signal and a control method thereof.

2. Description of the Related Art

Mobile communication systems are advancing to wireless data packet communication systems of high speed and high quality to provide data service and multimedia service over CDMA 2000 1x networks beyond voice oriented service provided over the conventional IS-95A and IS-95B networks. $3^{rd}$-generation (3G) mobile communication systems discussed as the wireless data packet communication systems comprise High Speed Downlink Packet Access (HSDPA) based on 3GPP and 1xEVDV system based on 3GPP2. The 3G mobile communication system enables to transmit radio packet data of high speed and high quality over 2 Mbps. Further, a 4G mobile communication system is under development to provide very high speed and high quality multimedia service over Internet Protocol (IP) network.

Since the high speed packet data service provides multimedia contents to a mobile terminal, a downlink capacity from a base station to the mobile terminal needs to increase. To increase the downlink capacity, more base stations can be installed or the frequency band can be extended. However, the base station installation requires much cost and the frequency band extension is subject to practical limitations. Instead, 3GPP/3GPP2 employs an array antenna to standardize a multiple antenna technique for enhancing the system throughput and the transmission capability of the base station.

The multiple antenna technique can provide transmit diversity and mitigate the multipath fading occurring in the downlink radio channel. Representative transmit diversity techniques comprise a Selective Transmit Diversity (STD), Space Time Spreading (STS), Space-Time Block Coding (STBC), and so forth. The transmit diversity techniques can be divided to an open-loop scheme which requires no feedback information and a closed-loop scheme which requires feedback information based on whether the feedback information including channel information is transmitted from a receiver to a transmitter.

The STD adopts the closed-loop scheme, and the STS and the STBC adopt the open-loop scheme. In general, the transmit diversity requiring the feedback information is subject to the degradation of the system throughput because of the transfer delay and the transfer error of the feedback information. Hence, it is difficult to apply the transmit diversity in a radio environment where the mobile terminal travels quite fast. The transmit diversity techniques can be classified to an antenna space technology. In the antenna space technology, the transmitter transmits signals over the individual transmit antenna and the receiver estimates the multipath fading channel from the individual transmit antenna and acquires a diversity gain by processing the signals received from the transmit antennas.

A representative adaptive antenna system using the antenna space technology is a Multiple Input Multiple Output (MIMO) system. Since the MIMO system spatial-multiplexes and transfers data, the communication system throughput can be greatly enhanced. On the assumption that the receiver can acquire the channel information, the MIMO system achieves a high data rate and a low bit error probability.

Particularly, a quasi-orthogonal STBC scheme is the transmission of transmission rate '1'. The receiver uses a maximum likelihood detection to decode the quasi-orthogonal STBC scheme. Disadvantageously, the maximum likelihood detection suffers high complexity.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an apparatus for decoding with low complexity and a control method thereof.

According to an aspect of the present invention, there is provided a decoding apparatus which comprises a channel estimator for estimating a real equivalent channel based on a coded signal; a channel converter for decomposing the real equivalent channel to a unit matrix and a subchannel; a receive signal converter for converting the coded signal to a real equivalent receive signal and converting the real equivalent receive signal to a converted receive signal based on the unit matrix; and a detector for detecting an estimate of a transmit signal by performing a maximum likelihood decoding using the converted receive signal and the subchannel.

The coded signal may be encoded using a quasi-orthogonal space-time block code.

The detector may comprise a hard decision part for determining a transmit signal candidate group using a hard decision; and an estimate detector for detecting a transmit signal estimate from the transmit signal candidate group output from the hard decision part by performing the maximum likelihood decoding.

The hard decision part may determine a real transmit signal candidate as the transmit signal candidate group from an imaginary transmit signal candidate using the hard decision.

The channel converter may rearrange columns of a real equivalent channel using an orthogonal matrix and convert the rearranged real equivalent channel to the unit matrix and the subchannel.

The coded signal may be transmitted over four transmit antennas.

The channel converter may convert the real equivalent channel to the unit matrix and the subchannel using a modified Gram-Schmidt (MGS).

The subchannel may be of an upper triangular matrix format.

The detector may detect the estimate corresponding to the transmit signal by independently decoding the converted receive signal corresponding to the coded signal.

According to the aspect of the present invention, a decoding method comprises estimating a real equivalent channel based on a coded signal; decomposing the real equivalent channel to a unit matrix and a subchannel; converting the coded signal to a real equivalent receive signal and converting the real equivalent receive signal to a converted receive signal based on the unit matrix; and detecting an estimate of a transmit signal by performing a maximum likelihood decoding using the converted receive signal and the subchannel.

The coded signal may be encoded using a quasi-orthogonal space-time block code.

The estimate detecting operation may comprise determining a transmit signal candidate group using a hard decision; and detecting a transmit signal estimate from the transmit signal candidate group by performing the maximum likelihood decoding.

The candidate group determining operation may determine a real transmit signal candidate as the transmit signal candidate group from an imaginary transmit signal candidate using the hard decision.

The channel decomposing operation may rearrange columns of a real equivalent channel using an orthogonal matrix and converts the rearranged real equivalent channel to the unit matrix and the subchannel.

The coded signal may be transmitted over four transmit antennas.

The channel converting operation may convert the real equivalent channel to the unit matrix and the subchannel using a modified Gram-Schmidt (MGS).

The subchannel may be of an upper triangular matrix format.

The estimate detecting operation may detect the estimate corresponding to the transmit signal by independently decoding the converted receive signal corresponding to the coded signal.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
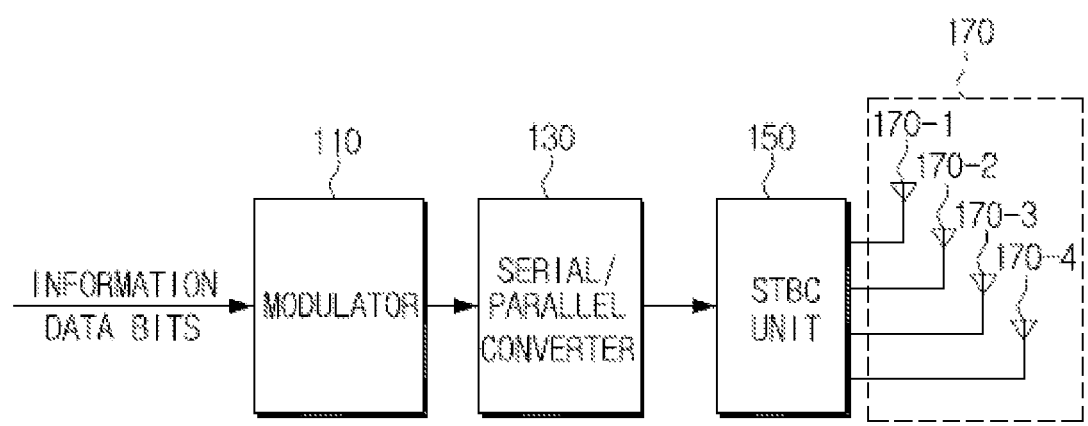
FIG. 1 is a diagram of a transmitter of a MIMO mobile communication system by using four transmit antennas and adopting a STBC scheme.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a diagram of a transmitter structure of a MIMO mobile communication system by using four transmit antennas and adopting a STBC scheme.

The transmitter of FIG. 1 comprises a modulator 110, a serial/parallel converter 130, a Space-Time Block Code (STBC) unit 150, and four transmit antennas 170; that is, a first transmit antenna 170-1 through a fourth transmit antennas 1704.

The modulator 110 generates modulation symbols by modulating information data bits input with a preset modulation scheme upon receiving the information data bits, and outputs the generated modulation symbols to the serial/parallel converter 130. The modulation scheme can employ one of Binary Phase Shift Keying (BPSK) scheme, Quadrature Phase Shift Keying (QPSK) scheme, Quadrature Amplitude Modulation (QAM) scheme, Pulse Amplitude Modulation (PAM) scheme, and Phase Shift Keying (PSK) scheme.

The serial/parallel converter 130 receives and parallel-converts the serial modulation symbols fed from the modulator 110 and outputs the parallel modulation symbols to the STBC unit 150. Herein, it is assumed that the serial modulation symbols output from the modulator 110 is $s_1 s_2 s_3 s_4$. The STBC unit 150 performs the quasi-orthogonal STBC to the four modulation symbols; that is, to $s_1 s_2 s_3 s_4$ fed from the serial/parallel converter 130 and produces a transmit signal s as expressed in Equation 1.

$$s = \begin{bmatrix} s_1 & -s_2^* & s_3 & -s_4^* \\ s_2 & s_1^* & s_4 & s_3^* \\ s_3 & -s_4^* & s_1 & -s_2^* \\ s_4 & s_3^* & s_2 & s_1^* \end{bmatrix}$$ [Equation 1]

s is a typical T×N matrix. In this exemplary embodiment of the present invention, since the block size of the STBC unit 150 is T=4 and the number of the transmit antennas is N=4, s is 4×4 matrix.

In the matrix of Equation 1, the elements of the row correspond to the modulation symbols transmitted on the transmit antennas 170 in a specific time interval, and the elements of the column correspond to the modulation symbols transmitted on a specific transmit antenna 170 in a unit time interval.

Specifically, in the first time interval, the first transmit antenna 170-1 sends $s_1$, the second transmit antenna 170-2 sends $-s_2^*$, the third transmit antenna 170-3 sends $s_3$, and the fourth transmit antenna 1704 sends $-s_4^*$. Likewise, in the fourth time interval, the first transmit antenna 170-1 sends $s_4$, the second transmit antenna 170-2 sends $s_3^*$, the third transmit antenna 170-3 sends $s_2$, and the fourth transmit antenna 170-4 sends $s_1^*$.

As expressed in Equation 1, the STBC unit 150 controls to transmit the modulation symbols on the four transmit antennas 170 in the four time intervals by applying the negative operation and the conjugate operation to the input modulation symbols.

Figure 2:
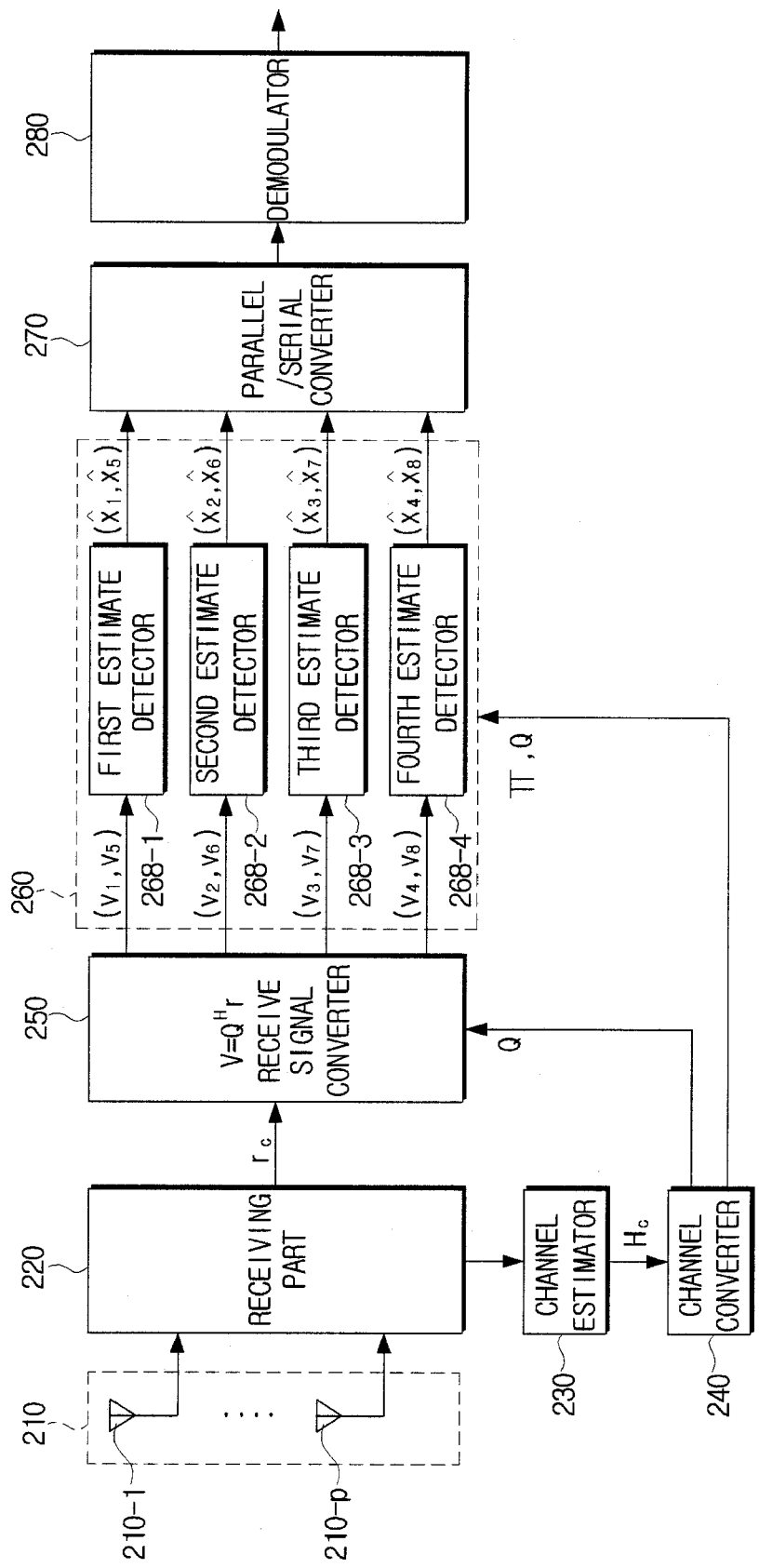
FIG. 2 is a block diagram of a receiver corresponding to the transmitter of FIG. 1 according to one exemplary embodiment of the present invention.

Now, a receiver structure corresponding to the transmitter structure of FIG. 1 is described by referring to FIG. 2.

FIG. 2 is a block diagram of the receiver corresponding to the transmitter of FIG. 1 according to one exemplary embodiment of the present invention.

The receiver of FIG. 2 comprises a plurality of receive antennas 210, e.g., P-ary receive antennas 210; a first receive antenna 210-1 through a P-th receive antenna 210-p, a receiving part 220, a channel estimator 230, a channel converter 240, a receive signal converter 250, a detector 260, a parallel/serial converter 270, and a demodulator 280. While it is assumed that the number of the transmit antennas 170 of the transmitter is different from the number of the receive antennas 210 of the receiver of FIG. 2, the number of the transmit antennas 170 of the transmitter may be equal to the number of the receive antennas 210 of the receiver.

As described earlier in FIG. 1, the signals transmitted over the four transmit antennas 170 of the transmitter are received at the first receive antenna 210-1 through the P-th receive antenna 210-p respectively.

The receiving part 220 provides the receive signal $r_c$ attained at the first receive antenna 210-1 through the P-th receive antenna 210-p to the channel estimator 230 and the receive signal converter 250.

To ease the understanding of the present invention, when the signals are transmitted to four receive antennas 210, the data received at the first receive antenna 210-1 is decoded, which is described.

The receive signal $r_c$ received at the receiver is expressed as Equation 2 by multiplying a transmit channel $H_c$ by the transmit signal s and adding noise n.

$$r_c = H_c s + n \qquad \text{[Equation 2]}$$

An estimate $\hat{s}$ for the transmit signal s detected at the detector 260 satisfies Equation 3.

$$\hat{s} = \arg\min \|r - H_c s\| \qquad \text{[Equation 3]}$$

The channel estimator 230 generates a channel matrix $H_c$ as expressed in Equation 4 by estimating channel coefficients h which represent the channel gain of the receive signals received on the receive antennas 210 respectively.

$$H_c = \begin{bmatrix} h_1 & h_2 & h_3 & h_4 \\ h_2^* & -h_1^* & h_4^* & -h_3^* \\ h_3 & h_4 & h_1 & h_2 \\ h_4^* & -h_3^* & h_2^* & -h_1^* \end{bmatrix} \qquad \text{[Equation 4]}$$

$h_i$, which is a zero-mean independent complex Gaussian random variable, is a channel gain of receiving the receive signal on the i-th antenna.

The channel estimator 230 converts the channel matrix $H_c$ to a real equivalent channel as expressed in Equation 5.

$$H = \begin{bmatrix} \text{Re}\{H_c\} & -\text{Im}\{H_c\} \\ \text{Im}\{H_c\} & \text{Re}\{H_c\} \end{bmatrix} \qquad \text{[Equation 5]}$$

While the columns of the complex channel $H_c$ may not be orthogonal, the real column and the imaginary column of the real equivalent channel are orthogonal each other. The real equivalent channel becomes 8×8 matrix.

In the mean time, to detect the transmit signal using the real equivalent channel the receive signal $r_c$ is converted to a real equivalent receive signal r as expressed in Equation 6.

$$r = [\text{Re}\{r_c\} \, \text{Im}\{r_c\}]^T \qquad \text{[Equation 6]}$$

The transmit signal candidate s is also converted to a real equivalent transmit signal candidate x as expressed in Equation 7.

$$x = [\text{Re}\{s\} \, \text{Im}\{s\}]^T \qquad \text{[Equation 7]}$$

The channel converter 240 rearranges the columns of the real equivalent channel H to decompose the real equivalent channel H to a matrix of the simplified QR format. To rearrange the real equivalent channel H, the channel converter 240 generates a channel $H_{perm} = \Pi s$ permutated by multiplying the matrix $\Pi$ of Equation 8 by the real equivalent channel H.

Next, to make the permutated channel $H_{perm}$ meet Equation 2, the channel converter 240 applies the matrix $\Pi$ required to rearrange the columns of the real equivalent channel H to the detector 260. Hence, the detector 260 generates the permutated transmit signal $x_{perm} = \Pi x$ by multiplying the real equivalent transmit signal s by the matrix $\Pi$.

$$\Pi = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{bmatrix} \qquad \text{[Equation 8]}$$

Accordingly, the real equivalent receive signal r can be expressed as Equation 9 by multiplying the permutated channel $H_{perm}$ by the permutated transmit signal $x_{perm}$ and adding the noise n.

$$r = H_{perm} x_{perm} + n \qquad \text{[Equation 9]}$$

Note that the noise n in Equation 9 is also the real equivalent noise.

The channel converter 240 decomposes the permutated channel $H_{perm}$ to QR using the modified Gram-Schmidt (MGS). In doing so, Q is a unit matrix 8×8. R, which is the subchannel of the permutated channel, is a 8×8 upper triangular format matrix expressed as Equation 10.

$$R = \begin{bmatrix} r_{11} & 0 & 0 & 0 & r_{15} & 0 & 0 & 0 \\ 0 & r_{22} & 0 & 0 & 0 & r_{26} & 0 & 0 \\ 0 & 0 & r_{33} & 0 & 0 & 0 & r_{37} & 0 \\ 0 & 0 & 0 & r_{44} & 0 & 0 & 0 & r_{48} \\ 0 & 0 & 0 & 0 & r_{55} & 0 & 0 & 0 \\ 0 & 0 & 0 & 0 & 0 & r_{66} & 0 & 0 \\ 0 & 0 & 0 & 0 & 0 & 0 & r_{77} & 0 \\ 0 & 0 & 0 & 0 & 0 & 0 & 0 & r_{88} \end{bmatrix}$$

$$= \begin{bmatrix} r_{11} & 0 & 0 & 0 & r_{15} & 0 & 0 & 0 \\ 0 & r_{11} & 0 & 0 & 0 & r_{15} & 0 & 0 \\ 0 & 0 & r_{11} & 0 & 0 & 0 & r_{15} & 0 \\ 0 & 0 & 0 & r_{11} & 0 & 0 & 0 & r_{15} \\ 0 & 0 & 0 & 0 & r_{55} & 0 & 0 & 0 \\ 0 & 0 & 0 & 0 & 0 & r_{55} & 0 & 0 \\ 0 & 0 & 0 & 0 & 0 & 0 & r_{55} & 0 \\ 0 & 0 & 0 & 0 & 0 & 0 & 0 & r_{15} \end{bmatrix} \qquad \text{[Equation 10]}$$

wherein

-continued $$r_{11} = r_{22} = r_{33} = r_{44} = \|h_{perm1}\|,$$

$$r_{55} = r_{66} = r_{77} = r_{88} =$$

$$\sqrt{h_{perm3}^H h_{perm3} + |R_{13}|^2 - (h_{perm3}^H h'_{perm1} + (h'_{perm1})^H h_{perm3})}$$

$$r_{13} = r_{26} = r_{37} = r_{48} = \frac{1}{R_{11}} h_{perm1}^H h_{perm2}$$

In Equation 10, $h_{perm\ i}$ denotes i-th row of the permutated channel $H_{perm}$, $h_i^H$ denotes the Hermitian transpose of the i-th row of $H_{perm}$, and $\|h_i\|$ denotes the Euclidean norm of $h_i$. $h_{perm\ 1}'$ is $(R_{13}/R_{11})h_1$.

Accordingly, the equivalent expression by multiplying Equation 9 by $Q^H$ is expressed as Equation 11. The detector 260 detects a signal satisfying Equation 11 among the permutated transmit signal candidates $(x_{perm\ j}, x_{perm\ j+4})$ (j=1, 2, 3, 4) as a permutated estimate $(\hat{x}_{perm\ j}, \hat{x}_{perm\ j+4})$ (j=1, 2, 3, 4)

$$v = Rx_{perm} + \tilde{n} \quad \text{[Equation 11]}$$

$$\hat{x}_{perm} = \operatorname{argmin} \|v - Rx_{perm}\|^2 \quad \text{[Equation 12]}$$

$$= \operatorname{argmin} \sum_{j=1}^{4} f_j$$

In Equations 11 and 12, $v=Q^H r$, $\tilde{n}=Q^H n$, and $f_j = |v_j - r_{11}x_{perm\ j} - r_{15}x_{perm\ j+4}|^2 + |v_{j+1} - r_{55}x_{perm\ j+4}|^2$. By taking into account the between the rows, Equation 12 can be expressed as Equation 13.

$$\hat{x}_{perm} = \operatorname{argmin} \sum_{j=1}^{4} f_j \quad \text{[Equation 13]}$$

$$= \sum_{j=1}^{4} \operatorname{argmin} f_j$$

As one can see from Equation 13, the permutated transmit signal candidates $(x_{perm\ j}, x_{perm\ j+4})$ are independent of each other. Hence, when the detector 260 detects the estimate of the transmit signal using the maximum likelihood, the complexity is lowered.

To detect the estimate as above, the channel converter 230 applies Q to the receive signal converter 250 and applies the matrix Π and the matrix Q to the detector 260.

The receive signal converter 250 converts the receive signal $r_c$ provided from the receiving part 220 to the real equivalent receive signal r of Equation 6 and generates $Q^H$ from Q provided from the channel converter 240. Next, the receive signal converter 250 generates the receive signal $v=Q^H r$ converted by multiplying the generated $Q^H$ by the equivalent receive signal r, and applies the converted receive signal v to the detector 260.

The detector 260 detects an estimate of the transmit signal by performing the maximum likelihood decoding using the converted receive signal v fed from the receive signal converter 250 and the subchannel R fed from the channel converter 240.

Since the individual permutated transmit signal candidate $(x_{perm\ j}, x_{perm\ j+4})$ is independent from the other permutated transmit signal candidates as shown in Equation 12, four estimate detectors 260 independently detect the estimate of the corresponding transmit signal in the detector 260. Specifically, the first estimate detector 268-1 receives the converted receive signals $v_1$, $v_5$ from the receive signal converter 250, receives $r_{11}$, $r_{15}$, $r_{55}$ from the channel converter 240, detects the permutated estimate $\hat{x}_{perm\ 1}$, $\hat{x}_{perm\ 5}$ meeting Equation 12 from the transmit signal candidates, and outputs the estimate $\hat{x}_1$, $\hat{x}_5$ for the transmit signal corresponding to the permutated estimate. The second estimate detector 268-2 through the fourth estimate detector 268-4 also detect the estimate of the corresponding transmit signal.

After the estimate detection as above, the first estimate detector 268-1 detects $(x_1, x_5)$ The required maximum likelihood complexity is 0 ($\Omega$), where $\Omega$ is the modulation order. Likewise, the maximum likelihood complexity required for the second estimate detector 268-2, the third estimate detector 268-3, and the fourth estimate detector 268-4 to detect the estimate is 0 ($\Omega$) respectively. Ultimately, the maximum likelihood complexity of the detector 260 is 0 (4$\Omega$).

In this exemplary embodiment of the present invention, the descriptions are limited to the case where the signals are transmitted over the four transmit antennas. In general, when the signals are transmitted over n-ary transmit antennas, the maximum likelihood complexity of the receiver is 0 (N$\Omega$) which is considerably reduced compared to the conventional 0 ($\Omega^{N/2}$).

If the detector 260 knows the estimate $\hat{x}_{j+4}$ of the transmit signal $x_{j+4}$, the maximum likelihood complexity of the receiver can be far more lowered.

When the detector 260 knows $\hat{x}_{j+4}$, $\hat{x}_j$ is expressed as Equation 14.

$$\hat{x}_{permj} = \operatorname{argmin} |v_j - r_{11}x_{permj} - r_{15}x_{permj+4}|^2 + \quad \text{[Equation 14]}$$

$$|v_{j+1} - r_{55}x_{permj+4}|^2$$

$$= \operatorname{argmin} |\hat{v} - rx_{permj}|^2$$

$$= D(\hat{v}_j / r_{11})$$

That is, the detector 260 can easily detect the permutated estimate $\hat{x}_{perm\ j}$ merely using the hard decision.

When $\hat{x}_{perm\ j}$ is detected, the complexity of the first estimate detector 268-1 for detecting $\hat{x}_{perm\ j}$ becomes 0 ($\Omega^{1/2}$). Thus, the maximum likelihood complexity of the detector 260 is 0 ($4\Omega^{1/2}$).

In this exemplary embodiment of the present invention, the signals are transmitted over the four transmit antennas. In general, if the signals are transmitted over n-ary transmit antennas, the maximum likelihood complexity of the receiver is 0 (N$\Omega^{N/4}$), which is considerably decreased compared to the conventional 0 ($\Omega^{N/2}$).

The parallel/serial converter 270 serial-converts the parallel modulation symbols which are the estimates output from the detector 260 and then outputs the serial modulation symbols to the demodulator 280. The demodulator 280 receives the serial modulation symbols from the parallel/serial converter 270 and restores the original information data bits by demodulating the symbols using a demodulation scheme corresponding to the modulation scheme applied at the modulator 110 of the transmitter.

Figure 3:
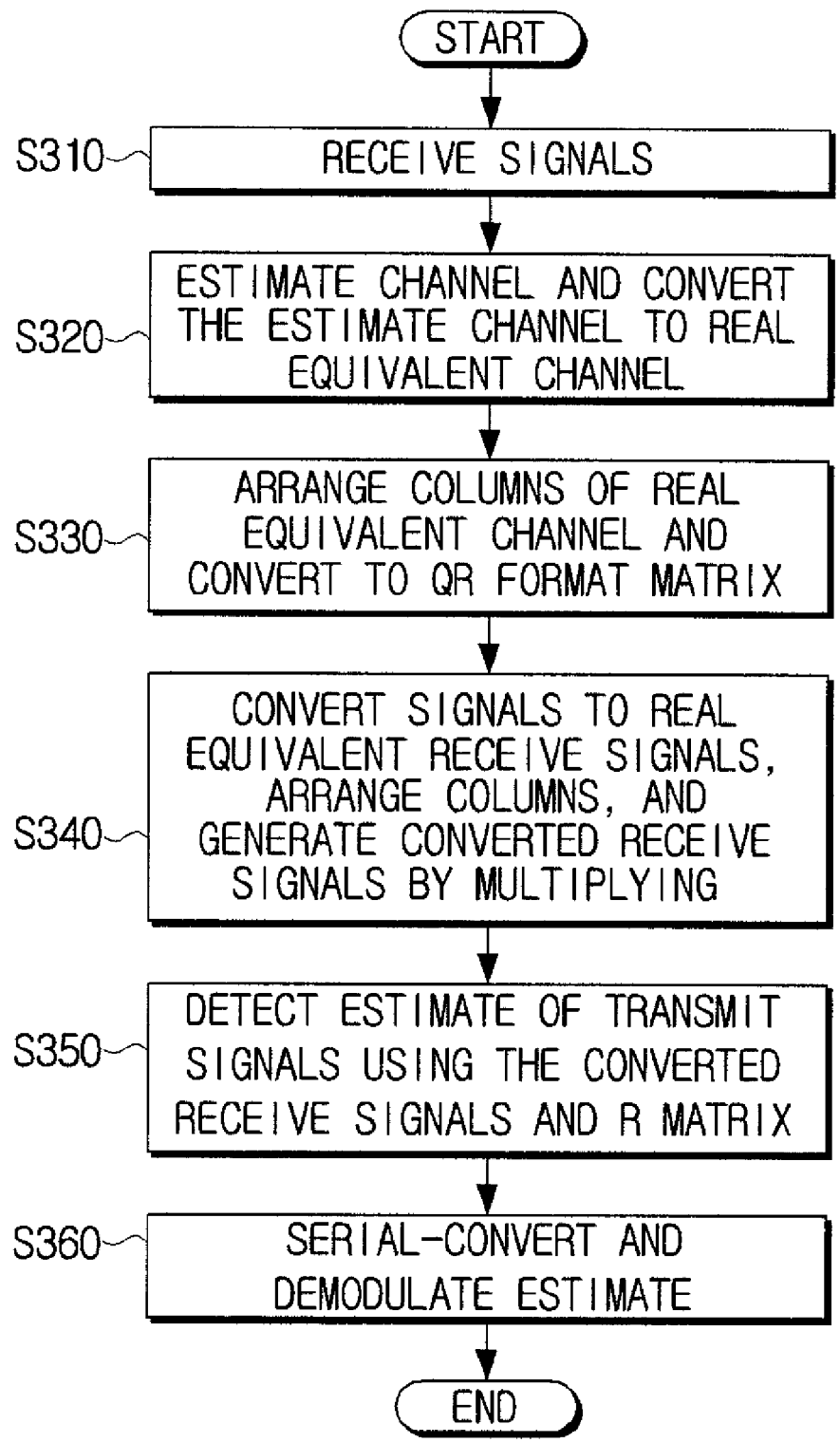
FIG. 3 is a flowchart of a signal demodulating method of the receiver of FIG. 2.

FIG. 3 is a flowchart of a signal demodulating method of the receiver of FIG. 2.

The receiving part 220 receives the receive signals on the receive antennas 210 and applies the receive signals to the channel estimator 230 and the receive signal converter 250 (S310).

The channel estimator 230 estimates the channel $H_c$ based on the receive signals, converts the estimated channel $H_c$ to the real equivalent channel H, and applies the converted real equivalent channel H to the channel converter 240 (S320).

The channel converter 240 arranges the columns of the real equivalent channel H and decomposes the real equivalent channel H to the QR matrix using the MGS (S330). The channel converter 240 applies the matrix H used to arrange the columns of the real equivalent channel H to the receive signal converter 250.

In the mean time, the receive signal converter 250 converts the receive signal fed from the receiving part 220 to the real equivalent receive signal r and arranges the columns of the real equivalent receive signal r in the same manner as the column arrangement of the real equivalent channel H. Next, the receive signal converter 250 generates and applies the converted receive signal to the detector 260 (S340).

The detector 260 detects the estimate of the transmit signal by executing the maximum likelihood decoding based on the matrix R fed from the channel converter 240 and the converted receive signal (S350).

The parallel/serial converter 270 serial-converts the detected estimate of the transmit signal, and the demodulator 280 acquires the original information data bits by demodulating the serial symbols (S360).

Figure 4:
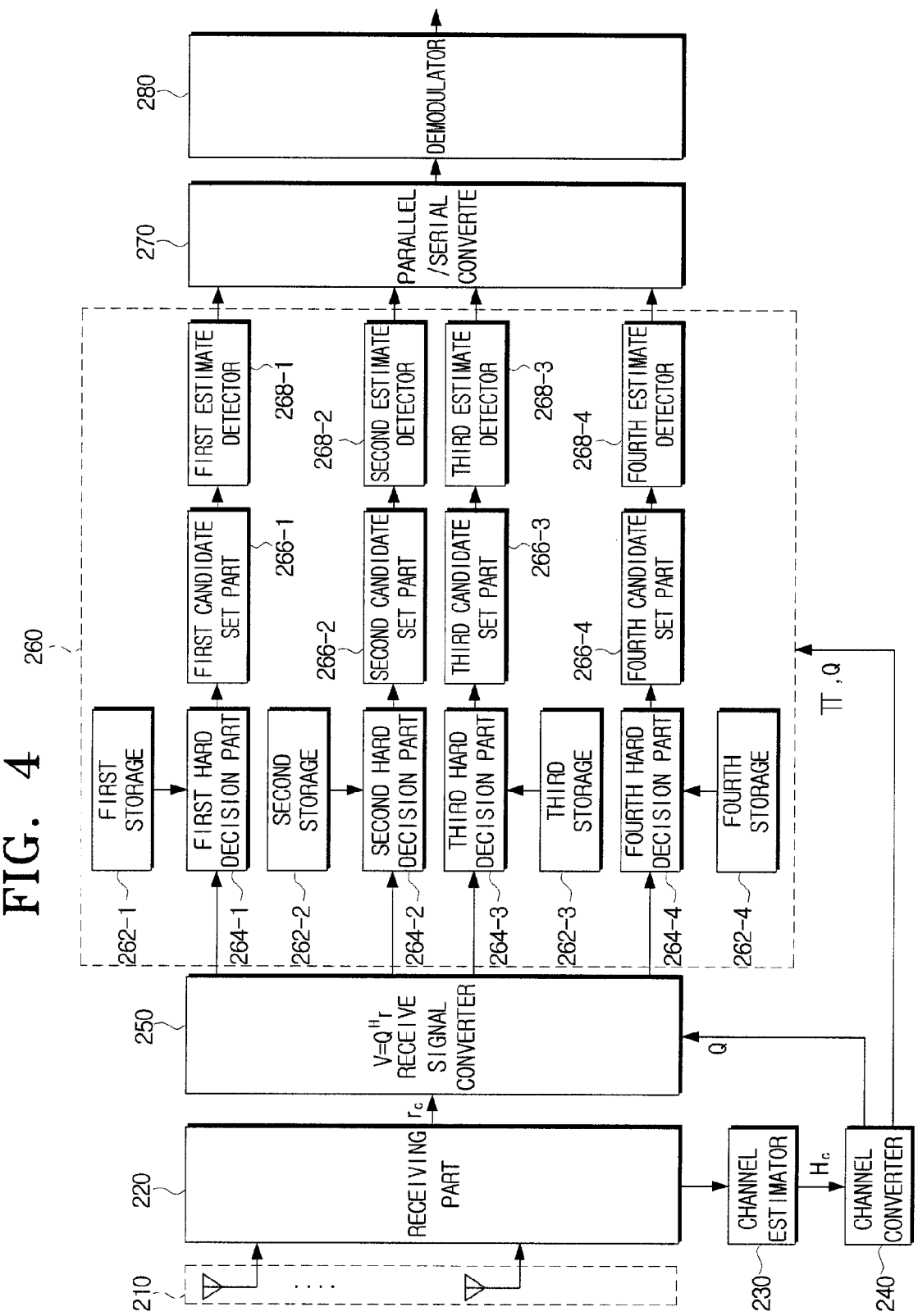
FIG. 4 is a block diagram of a receiver using hard decision according to another exemplary embodiment of the present invention.

FIG. 4 is a block diagram of a receiver using the hard decision according to another exemplary embodiment of the present invention.

Unlike the detector 260 of FIG. 2, a detector 260 of FIG. 4 further comprises first through fourth storages 262-1 through 262-4, first through fourth hard decision parts 264-1 through 264-4, and first through fourth candidate set parts 266-1 through 266-4.

The first through fourth storages 262-1 through 262-4 store candidates for $x_5$, $X_6$, $X_7$ and $x_8$ respectively.

The first through fourth hard decision parts 264-1 through 264-4 decides $x_1$, $x_2$, $x_3$ and $x_4$ candidates corresponding to the $x_5$, $x_6$, $x_7$ and $x_8$ candidates stored to the first through fourth storages 262-1 through 262-4 respectively using the hard decision. The first through fourth hard decision parts 264-1 through 264-4 apply the decided candidate groups $(x_1, x_5)$, $(x_2, x_6)$, $(x_3, x_7)$ and $(x_4, x_8)$ to the candidate set parts 266-1 through 266-4 respectively.

The first through fourth candidate set parts 266-1 through 266-4 temporarily store the candidate groups fed from the first through fourth hard decision parts 264-1 through 264-4 and apply the candidate groups to the first through fourth estimate detectors 268-1 through 268-4.

The first through fourth estimate detectors 268-1 through 268-4 determine the candidate group meeting Equation 10 among the candidate groups stored to the first through fourth candidate set parts 266-1 through 266-4 as the permutated estimate and detects the estimate of the transmit signal corresponding to the permutated estimate.

As such, since the candidate group is determined using the hard decision and the estimate is detected from the determined candidate group, the complexity of the detector can be drastically reduced to 0 $(4\Omega^{1/2})$.

Figures 5, 6:
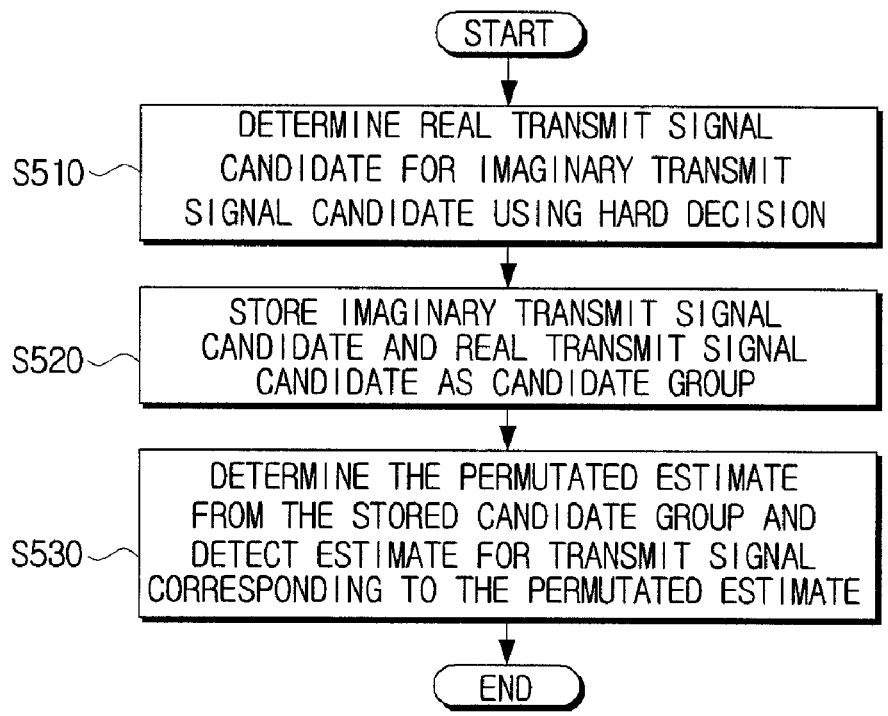
FIG. 5 is a flowchart of a maximum likelihood decoding method using the hard decision at the detector of FIG. 4.
FIG. 6 is a table showing the complexity of the conventional decoding method and the exemplary embodiments of the present invention.

FIG. 5 is a flowchart of a maximum likelihood decoding method using the hard decision at the detector 260 of FIG. 4. Since the receiver of FIG. 4 receives the receive signals, generates the permutated channel R and the converted receive signal $r_{perm}$, serial-converts and modulates the symbols as explained in FIG. 3, further description shall be omitted. The decoding method of the detector 260 is now illustrated.

The first through fourth hard decision parts 264-1 through 264-4 determine the real transmit signal candidate $x_{perm j}$ with respect to the imaginary transmit signal candidate $x_{perm\ j+4}$ stored to the first through fourth storages 262-1 through 262-4 using the hard decision (S510).

The first through fourth candidate set parts 266-1 through 266-4 temporarily store the imaginary transmit signal candidate and the real transmit signal candidate determined at the first through fourth hard decision parts 264-1 through 264-4 as the candidate group (S520).

The first through fourth estimate detectors 268-1 through 268-4 determines one of the candidate groups stored to the first through fourth candidate set parts 266-1 through 266-4 as the permutated estimate using the maximum likelihood decoding, and detect the estimate of the transmit signal corresponding to the permutated estimate (S530).

FIG. 6 is a table showing the complexity of the conventional decoding method and the exemplary embodiments of the present invention. In FIG. 6, the number of the transmit antennas is four, $\Omega$ is the modulation order, $C_A$ is the complexity of the real addition, and $C_M$ is the complexity of the real multiplication. The multiplication complexity of the complex number is the sum of four-time real multiplication and two-time real addition, and the addition complexity of the complex number is equivalent to two-time real addition. The complexity of the norm and the square is equivalent to the multiplication complexity of the complex number.

As shown in FIG. 6, in case of 16 QAM, the complexity according to one exemplary embodiment of the present invention is reduced to $1/14$ compared to the conventional complexity, and the complexity according to another exemplary embodiment of the present invention is reduced to $1/73$ compared to the conventional complexity. In case of 64 QAM, the complexity of one and another exemplary embodiments is reduced to $1/60$ and $1/744$ respectively. That is, the maximum likelihood complexity of the present invention can be drastically reduced in the higher-order QAM.

Figure 7:
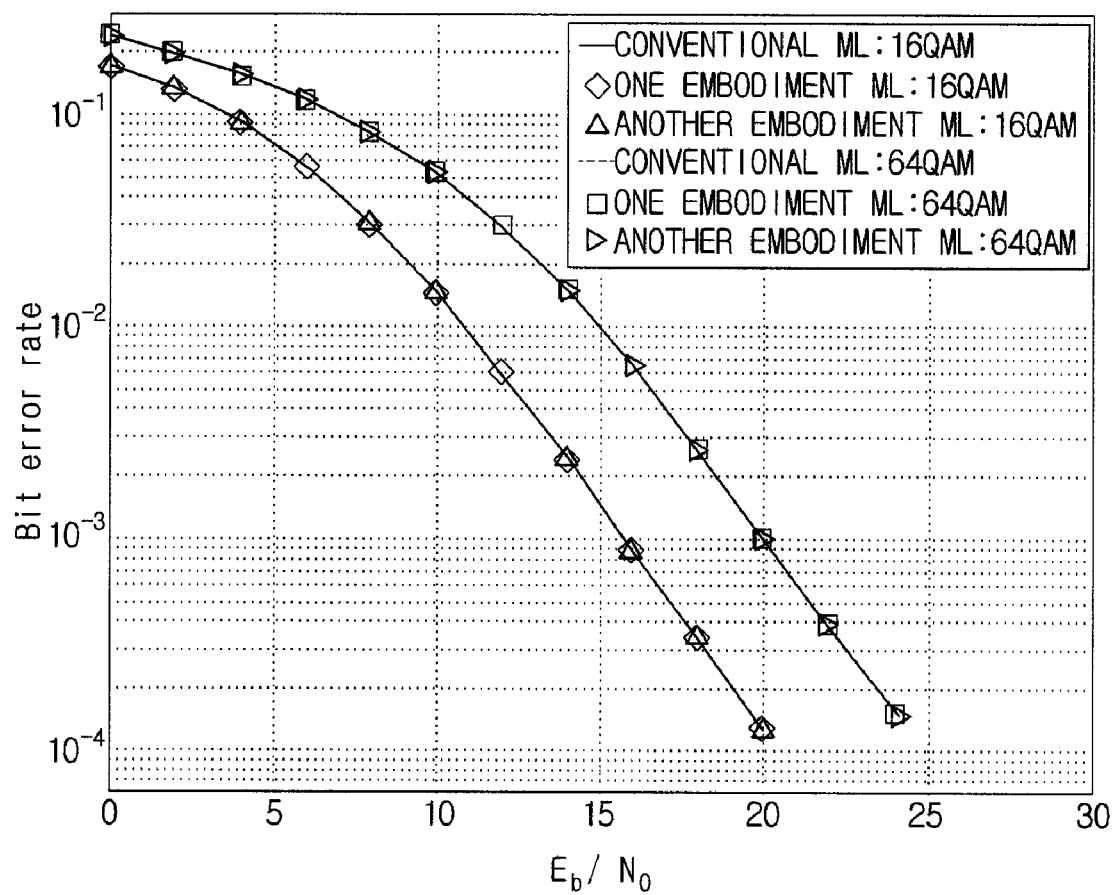
FIG. 7 is a graph showing the bit error rate of the conventional decoding method and the present decoding method.

FIG. 7 is a graph showing the bit error rate of the conventional decoding method and the present decoding method. In FIG. 7, the number of the transmit antennas is four. As one can see from FIG. 7, the performance of the conventional decoding method is substantially the same as the performance of the present decoding method.

Therefore, with substantially the same performance as the conventional method, the present decoding method can drastically reduce the complexity.

While the MIMO mobile communication system using four transmit antennas has been illustrated by way of example, the decoding method of the present invention is applicable to a MIMO mobile communication systems using an even number of transmit antennas.

As set forth above, since the transmit signal candidates for the maximum likelihood decoding method are independent of each other, the complexity of the maximum likelihood decoding can be decreased. In addition, with the lowered complexity of the receiver, the power consumption for the decoding can be reduced and the high-speed data can be transmitted more easily in the actual mobile communication environment.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A decoding apparatus comprising:
   a channel estimator which estimates a real equivalent channel based on a coded signal;
   a channel converter which decomposes the real equivalent channel to a unit matrix and a subchannel;
   a receive signal converter which converts the coded signal to a real equivalent receive signal and converts the real equivalent receive signal to a converted receive signal based on the unit matrix; and
   a detector which detects an estimate of a transmit signal by performing a maximum likelihood decoding using the converted receive signal and the subchannel,
   wherein the channel converter rearranges columns of a real equivalent channel using an orthogonal matrix and converts the rearranged real equivalent channel to the unit matrix and the subchannel.

2. The decoding apparatus of claim 1, wherein the coded signal is encoded using a quasi-orthogonal space-time block code.

3. The decoding apparatus of claim 1, wherein the detector comprises:
   a hard decision part which determines a transmit signal candidate group using a hard decision; and
   an estimate detector which detects a transmit signal estimate from the transmit signal candidate group output from the hard decision part by performing the maximum likelihood decoding.

4. The decoding apparatus of claim 3, comprising:
   a channel estimator which estimates a real equivalent channel based on a coded signal;
   a channel converter which decomposes the real equivalent channel to a unit matrix and a subchannel;
   a receive signal converter which converts the coded signal to a real equivalent receive signal and converts the real equivalent receive signal to a converted receive signal based on the unit matrix; and
   a detector which detects an estimate of a transmit signal by performing a maximum likelihood decoding using the converted receive signal and the subchannel,
   wherein the detector comprises:
   a hard decision part which determines a transmit signal candidate group using a hard decision; and
   an estimate detector which detects a transmit signal estimate from the transmit signal candidate group output from the hard decision part by performing the maximum likelihood decoding,
   wherein the hard decision part determines a real transmit signal candidate as the transmit signal candidate group from an imaginary transmit signal candidate using the hard decision.

5. The decoding apparatus of claim 1, wherein the coded signal is transmitted over four transmit antennas.

6. The decoding apparatus of claim 1, wherein the channel converter converts the real equivalent channel to the unit matrix and the subchannel using a modified Gram-Schmidt (MGS).

7. The decoding apparatus of claim 1, wherein the subchannel is in an upper triangular matrix format.

8. The decoding apparatus of claim 1, wherein the detector detects the estimate corresponding to the transmit signal by independently decoding the converted receive signal corresponding to the coded signal.

9. A decoding method comprising:
   estimating a real equivalent channel based on a coded signal;
   decomposing the real equivalent channel to a unit matrix and a subchannel;
   converting the coded signal to a real equivalent receive signal and converting the real equivalent receive signal to a converted receive signal based on the unit matrix; and
   detecting an estimate of a transmit signal by performing a maximum likelihood decoding using the converted receive signal and the subchannel,
   wherein the channel decomposing operation rearranges columns of a real equivalent channel using an orthogonal matrix and converts the rearranged real equivalent channel to the unit matrix and the subchannel.

10. The decoding method of claim 9, wherein the coded signal is encoded using a quasi-orthogonal space-time block code.

11. The decoding method of claim 9, wherein the estimate detecting operation comprises:
    determining a transmit signal candidate group using a hard decision; and
    detecting a transmit signal estimate from the transmit signal candidate group by performing the maximum likelihood decoding.

12. A decoding method comprising:
    estimating a real equivalent channel based on a coded signal;
    decomposing the real equivalent channel to a unit matrix and a subchannel;
    converting the coded signal to a real equivalent receive signal and converting the real equivalent receive signal to a converted receive signal based on the unit matrix; and
    detecting an estimate of a transmit signal by performing a maximum likelihood decoding using the converted receive signal and the subchannel, wherein the estimate detecting operation comprises:
    determining a transmit signal candidate group using a hard decision; and
    detecting a transmit signal estimate from the transmit signal candidate group by performing the maximum likelihood decoding, and
    wherein the candidate group determining operation determines a real transmit signal candidate as the transmit signal candidate group from an imaginary transmit signal candidate using the hard decision.

13. The decoding method of claim 9, wherein the coded signal is transmitted over four transmit antennas.

14. The decoding method of claim 9, wherein the channel converting operation converts the real equivalent channel to the unit matrix and the subchannel using a modified Gram-Schmidt (MGS).

15. The decoding method of claim 9, wherein the subchannel is of an upper triangular matrix format.

16. The decoding method of claim 9, wherein the estimate detecting operation detects the estimate corresponding to the transmit signal by independently decoding the converted receive signal corresponding to the coded signal.

* * * * *